(12) United States Patent
Kraft et al.

(10) Patent No.: US 7,392,265 B2
(45) Date of Patent: *Jun. 24, 2008

(54) UPDATING DATA IN A MULTI-SYSTEM NETWORK THAT UTILIZES ASYNCHRONOUS MESSAGE TRANSFER

(75) Inventors: Frank Michael Kraft, Speyer (DE); Guenter Pecht-Seibert, Muehlhausen (DE)

(73) Assignee: SAP AG, Walldorf (DE)

( * ) Notice: Subject to any disclaimer, the term of this patent is extended or adjusted under 35 U.S.C. 154(b) by 459 days.

This patent is subject to a terminal disclaimer.

(21) Appl. No.: 10/726,296

(22) Filed: Dec. 2, 2003

(65) Prior Publication Data
US 2005/0120355 A1 Jun. 2, 2005

(51) Int. Cl.
*G06F 17/30* (2006.01)
(52) U.S. Cl. ........................................ 707/200; 719/313
(58) Field of Classification Search ............... 707/8, 707/104.1, 200–203, 10; 719/311–313, 320; 715/511, 514, 530
See application file for complete search history.

(56) References Cited

U.S. PATENT DOCUMENTS

| | | | |
|---|---|---|---|
| 4,694,422 A | | 9/1987 | Kakuda et al. |
| 4,777,595 A | | 10/1988 | Strecker et al. |
| 5,551,046 A | * | 8/1996 | Mohan et al. ................. 707/8 |
| 5,655,075 A | | 8/1997 | Saito et al. |
| 5,812,793 A | * | 9/1998 | Shakib et al. ............... 709/201 |
| 5,842,216 A | | 11/1998 | Anderson et al. |
| 5,864,837 A | | 1/1999 | Maimone et al. |
| 5,974,129 A | | 10/1999 | Bodnar |
| 6,041,333 A | * | 3/2000 | Bretschneider et al. ..... 707/203 |
| 6,212,653 B1 | | 4/2001 | Boivin et al. ................. 714/45 |
| 6,405,219 B2 | * | 6/2002 | Saether et al. ............... 707/201 |

(Continued)

FOREIGN PATENT DOCUMENTS

EP   0 684 720 A   11/1995

(Continued)

OTHER PUBLICATIONS

"Anaylsis of Petri Net Performance Model," http://www.document.ic.ac.uk/~nd/surprise_95/journal/vol2/nr1/article2.html, printed from the Internet Sep. 5, 2003, 2 pgs.

(Continued)

*Primary Examiner*—Van H. Nguyen
(74) *Attorney, Agent, or Firm*—Mintz, Levin, Cohn, Ferris, Glovsky & Popeo, P.C.

(57) ABSTRACT

Techniques are provided for updating a locally stored version of a data set in a multi-system environment where each system maintains a separate stored version of the data set and is capable of modifying an attribute of the data set. An attribute of a data set stored locally in a first application system is modified and a message is generated containing the data set. The message is sent to a second application system that also maintains a version of the data set. The second application system receives the data set, and the attribute is compared to the attribute stored locally by the second application system. If the comparison indicates that the version of the attribute stored locally in the second application system is less recent than the version of the attribute in the received data set, the second application system's version of the attribute is replaced with the attribute in the message.

12 Claims, 5 Drawing Sheets

U.S. PATENT DOCUMENTS

| | | | |
|---|---|---|---|
| 6,415,315 | B1 | 7/2002 | Glass |
| 6,442,586 | B1 | 8/2002 | Glass |
| 6,529,932 | B1 | 3/2003 | Dadiomov et al. |
| 6,564,218 | B1 | 5/2003 | Roth |
| 6,631,386 | B1 | 10/2003 | Arun et al. |
| 6,738,797 | B1 | 5/2004 | Martin |
| 6,754,657 | B2 | 6/2004 | Lomet |
| 6,761,636 | B2 | 7/2004 | Chung et al. |
| 6,952,660 | B1 | 10/2005 | Matheson ............... 703/1 |

FOREIGN PATENT DOCUMENTS

| | | |
|---|---|---|
| EP | 0 926 608 A | 6/1999 |

OTHER PUBLICATIONS

"Application Link Enabling," http://searchsap.techtarget.com/sDefinition/0,,sid21_gci822148,00.html, May 7, 2002, printed from the Internet Dec. 10, 2003, 2 pgs.

Brink, Richard Scott, "A Petri Net Design, Simulation, and Verification Tool," Rochester Institute of Technology, Sep. 1996, http://www.csh.rit.edu/~rick/thesis/document/PetriThesis.html, printed from the Internet Sep. 5, 2003, 47 pgs.

Carryer, J. Edward, "State Machines," Feb. 2, 2001, http://design.stanford.edu/spdl/ee118/pdf_files/StatesMachines.pdf, printed from the Internet Sep. 5, 2003, 3 pgs.

"DotnetCoders—UML: Statechart Diagrams," copyright 2000-2003 .netCoders, http://www.dotnetcoders.com/web/learning/uml/diagrams/statechart.aspx, printed from the Internet Dec. 10, 2003, 2 pgs.

"Finite State Machine—A WhatIs Definition," http://whatis.techtarget.com/definition/0,,sid9_gci213052,00.html, printed from the Internet Dec. 10, 2003, 4 pgs.

'Half.com: Apple iPod Mini—Questions & Answers' [online]. half.com by ebay, undated materials, [retrieved on Mar. 7, 2005]. Retrieved from the Internet: <URL: http://half.ebay.com/cat/buy/ask_question.cgi?offer_id=1286774759&meta_id=6&domain_id=447>.

'Half.com: Apple iPod Mini—Seller's Description' [online]. half.com by ebay, undated materials, [retrieved on Mar. 16, 2005]. Retrieved from the Internet: <URL: http://half.ebay.com/cat/buy/inv.cgi?offer_id=1286774759&meta_id=6&cpid=1202509734&domainid=447>.

'The Next Evolution of E-Commerce—Tango Trade Press Release' [online]. Undated materials, [retrieved initially, in part, on Mar. 7, 2005, then again in its entirety on Apr. 28, 2005]. Retrieved from the Internet: <URL: http://www.p2p-zone.com/underground/showthread.php?s=&threadid=16211>. See, e.g., pp. 10-11.

'P2P Real Time Trading Community from Tango' [online]. Undated materials, [retrieved initially, in part, on Mar. 7, 2005; then again in its entirety on Apr. 28, 2005]. Retrieved from the Internet: <URL: http://www.collaborate.com/publication/newsletter/n10603.html#portal>. See, e.g., pp. 24-25.

Robinson, Scott, "Save Time and Effort with SAP's ALE Change Pointers," http://techrepublic.com.com/5102-6329-1048973.html, Aug. 12, 2002, copyright 1995-2003 CNET Networks, Inc., printed from the Internet Sep. 4, 2003, 3 pgs.

"StateMachines," copyright 1996-2002 BoldSoft, copyright 2002 Borland, http://information.borland.com/techpubs/delphi/boldfordelphi/html/Mech_StateMachines.htm, printed from the Internet Sep. 5, 2003, 1 pg.

'TangoTrade.net—About' [online]. Tango, undated materials, [retrieved on Mar. 16, 2005]. Retrieved from the Internet: <URL: http://www.tangotrade.net/about.html>.

'Tango Trade 2.0: End-User Market for: EBAY P/N 370-2304' [online]. Tango, undated materials, [retrieved on Mar. 7, 2005]. Retrieved from the Internet: <URL: http://rook.tangotrade.net/live/bidask.php?Item=370-2304&ManuName=EBAY>.

'Tango Trade 2.0: Sell an Item' [online]. Tango, undated materials, [retrieved on Mar. 7, 2005]. Retrieved from the Internet: <URL: http://dns-1.wtic.net/sell.php?&PHPAUCTION_SESSION=9182eb870619298ff76e18a31b0a7635>.

"UML Tutorial—State Diagrams," Kennesaw State University, http://pigseye.kennesaw.edu/~dbraun/csis/4650/A&D/UML_tutorial/state.htm, printed from the Internet Dec. 10, 2003, 4 pgs.

'Welcome to TangoTrade.net' [online]. Tango, undated materials, [retrieved on Mar. 7, 2005]. Retrieved from the Internet: <URL: http://www.tangotrade.net/index.html>.

Haase, Kim, "Java Message Service API Tutorial," Sun Developer Network Site, Aug. 2001, retrieved from the Internet on Jan. 7, 2004, at http://java.sun.com/products/jms/docs.htm, XP002266306, 270 pgs.

Johnson, David B, et al., "Sender-Based Message Logging," 7th Symposium on Fault-Tolerant Computing, 1987, retrieved from the Internet on Jan. 8, 2004, at http://citeseer.nj.necessary.com/johnson87senderbased.html, XP002266307, 6 pgs.

Kakuda, Yoshiaki, et al., "Automated Verification of Responsive Protocols Modeled by Extended Finite State Machines," Real-Time Systems, Kluwer Academic Publishers, Dordrecht, NL, vol. 7, No. 3, Nov. 1, 1994, XP 000485229, pp. 275-289.

Yuang, Maria C., "Survey of Protocol Verification Techniques Based on Finite State Machine Models," Apr. 11, 1988, Proceedings of the IEEE NBS Computer Networking Symposium, Washington, DC, XP010011847, pp. 164-172.

* cited by examiner

| Message Protocol | | | | | | | |
|---|---|---|---|---|---|---|---|
| Sending System ID | Delta Value | System 1 Data Value | System 2 Data Value | System 3 Data Value | System 1 Change Value | System 2 Change Value | System 3 Change Value | Total Value |

| Time | System 1 202 | System 2 204 | System 3 206 |
|---|---|---|---|
| 0 | (0, 0, 0) [0, 0, 0] 0 | (0, 0, 0) [0, 0, 0] 0 | (0, 0, 0) [0, 0, 0] 0 |
| 1 | +3 (3, 0, 0) [1, 0, 0] 3 | | |
| 2 | +4 (7, 0, 0) [2, 0, 0] 7 | | |
| 3 | | Rec. T2: (7, 0, 0) [2, 0, 0] | |
| 4 | | Update (7, 0, 0) [2, 0, 0] 7 | |
| 5 | | | +2 (0, 0, 2) [0, 0, 1] 2 |
| 6 | | -4 (7, -4, 0) [2, 1, 0] 3 | |
| 7 | | | Rec. T6: (7, -4, 0) [2, 1, 0] |
| 8 | | | Update (7, -4, 2) [2, 1, 1] 5 |
| 9 | Rec. T5 (0, 0, 2) [0, 0, 1] | | |
| 10 | Update (7, 0, 2) [2, 0, 1] 9 | | Rec T1 (3, 0, 0) [1, 0, 0] |
| 11 | | | Ignore T1 Message |
| 12 | | | |
| 13 | Rec. T6 (7, -4, 0) [2, 1, 0] | | |
| 14 | Update (7, -4, 2) [2, 1, 1] 5 | | |
| 15 | | Rec. T5 (0, 0, 2) [0, 0, 1] | |
| 16 | | Update (7, -4, 2) [2, 1, 1] 5 | |
| End Status | (7, -4, 2) [2, 1, 1] 5 | (7, -4, 2) [2, 1, 1] 5 | (7, -4, 2) [2, 1, 1] 5 |

*Fig. 5*

UPDATING DATA IN A MULTI-SYSTEM NETWORK THAT UTILIZES ASYNCHRONOUS MESSAGE TRANSFER

CROSS-REFERENCE TO RELATED APPLICATIONS

U.S. application Ser. No. 10/726,295, filed Dec. 2, 2003 and entitled "Updating and Maintaining Data in a Multi-System Network Using Asynchronous Message Transfer" is a related application to the present application.

TECHNICAL FIELD

This invention relates to asynchronous data transfer between different computing systems, and more particularly to techniques for updating data that is maintained and modified by two or more computing systems in a multiple-system environment where asynchronous messaging is employed.

BACKGROUND

A multiple-system network may include two or more systems that share a common data set. The multiple systems may share the data set by maintaining a local version of the data set in a local database. In some networks, each of the multiple systems may have the ability to modify or change the data set. These changes may be made to the system's local version of the data set and then communicated to the other systems in the network via asynchronous messaging. The messages allow the other systems to update their local data sets with the modifications that occurred in other systems so that the data sets of the various systems are consistent. Because asynchronous messaging may be used to update the various data sets in the network, it is possible that messages between the systems could be delayed or even lost. In the event of a lost message, a state of equilibrium between the data sets of the system may not be reached.

SUMMARY

The invention provides techniques for updating a locally stored version of a data set, wherein multiple application systems each maintain a separate stored version of the data set and are each capable of modifying an attribute of the data set. The attribute comprises multiple attribute components that are each associated with a different one of the multiple application systems, and each attribute component has a data value and a change value.

In an aspect, the invention provides a method for performing such an update. In the method, a message containing a data set as locally stored in a first application system is received at a second application system of the multiple application systems. For each attribute component of the data set, the attribute component's change value as stored locally in the second application system is compared with the attribute component's change value as contained in the received data set. If the comparison indicates that the version of the attribute component's data value as stored locally in the second application system is less recent than the version of the attribute component's data value contained in the received data set, the attribute component's data value stored locally in the second application system is replaced with the attribute component's data value contained in the received data set.

In another aspect, the invention provides a method for updating a locally stored version of a data set. In the method, an attribute of a data set stored locally in a first application system is modified. A message is generated containing the modified data set as locally stored in the first application system, the data set comprising multiple attribute components that are each associated with a different one of the multiple application systems. The message is sent to a second application system that maintains a version of the data set.

In embodiments, the methods may have one or more of the following features. The change value of the attribute component may be a timestamp that indicates the time of the modification to the attribute component's data value. The change value of the attribute component may also be a version number that is incremented after each modification to the attribute component's data value. The message may also have a total value that represents a sum of the attribute component data values in the data set as locally stored in the first application system. In some implementations, the message received by the second application system from the first application system may also include the attribute components associated with the second application system.

In some embodiments, the first application system may send messages to the second application system after each modification of the first application system's data set. The first application system may send a message to the second application system containing the first application system's data set after each modification of an attribute component of the first application system's data set. Asynchronous messages may be used to send the messages to the second application system.

In other aspects, the invention provides computer program products that perform the above-described methods. In particular, the computer program products comprise executable instructions embodied on either a computer readable medium or a propagated signal.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is a diagram showing an example protocol for a message that may be transferred between the systems of FIG. 1.

FIG. 5 is a table that illustrates the method of updating the data sets of the multiple systems shown in FIG. 4.

Like reference symbols in the various drawings indicate like elements.

DETAILED DESCRIPTION

Figure 1:
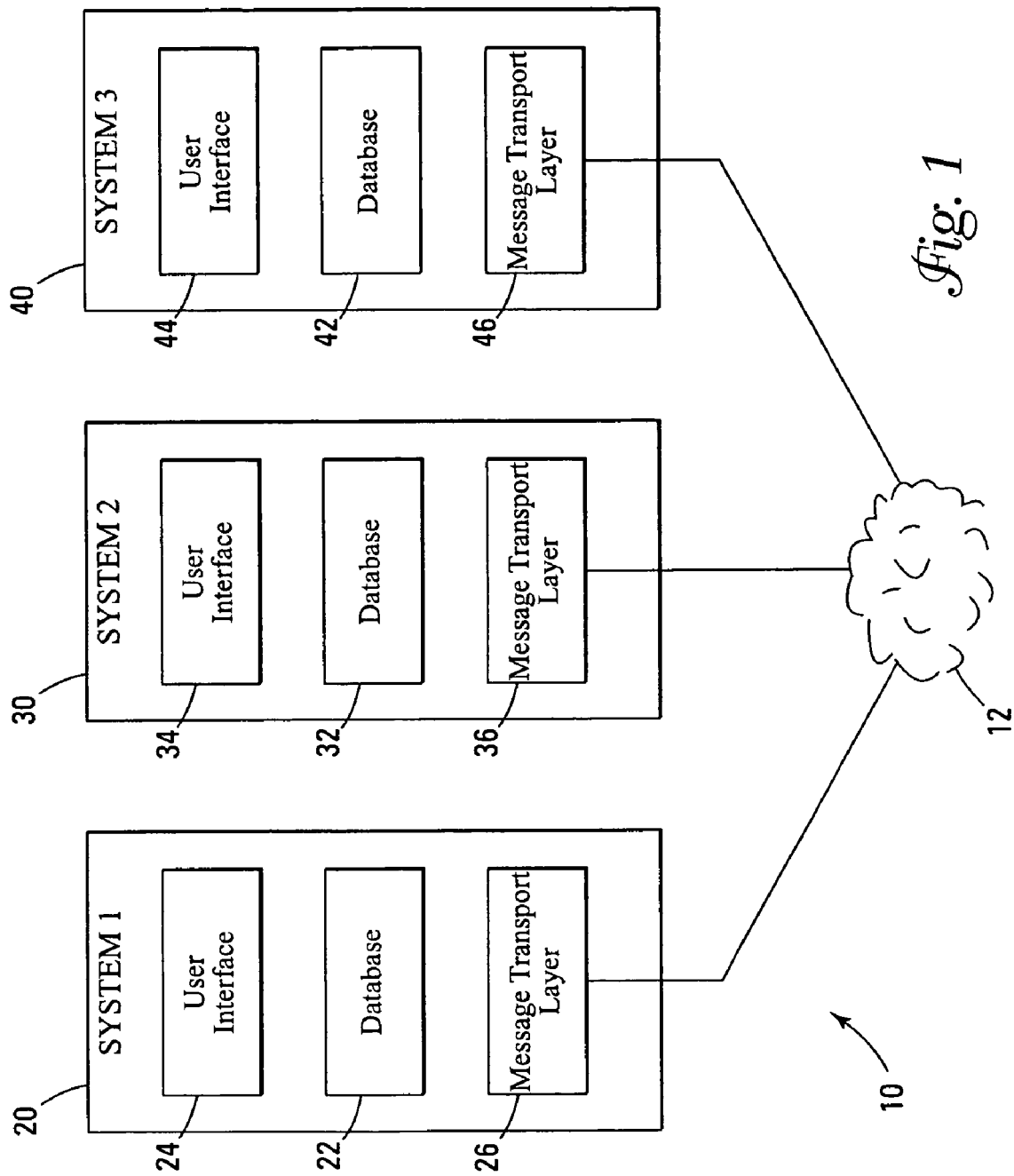
FIG. 1 is a block diagram of a multiple-system network in which a data set is maintained and modified by the multiple systems.

A multi-system network 10, shown in FIG. 1, includes three networked computing systems, which in this example are a first system 20, a second system 30, and a third system 40.

The systems 20, 30, and 40 each maintain a data set that is shared by the systems in the network 10. Each system's data set includes multiple data values and change values that correspond to each data value. The change values track the modifications or changes that are made to the data values. For each modification made by one of the systems 20, 30, and 40 to a data value in the data set, the modifying system sends an asynchronous message containing the system's entire data set to the other systems in the network 10. When a system receives the message, the system compares the change values in the received message to the corresponding change values in the system's local data set. If the change values indicate that a particular data value in the message is more recent than the corresponding data value in the system's data set, the system updates its local data set with the more recent data value in the message. By including in the update message all of the data values and change values in the modifying system's data set, any inconsistencies that may exist among the data sets of the multiple systems in the network 10 due to delayed or lost messages may be repaired.

The first system 20 includes a database 22, a user interface 24, and a message transport layer 26. The database 22 contains the system's local version of the data set that is shared by the various systems 20, 30, and 40 in the network 10. In the FIG. 1 example, the data set relates to products or inventory information and may be used to track the quantities of items that are purchased, sold, returned, etc. In other examples, the data set may relate to banking information, accounting information, or other types of information that may be maintained using the methods described herein.

The data set in this example includes a data value for its own system 20 and a data value for each of the other systems 30 and 40 in the network 10. In other examples, the data set may include multiple data values for the systems, or alternatively, the data values for certain systems may be omitted. The data set also includes a corresponding change value for each of the data values. The change value may be, for example, a version number that is incremented after each change or modification of the data value. Alternatively, the change value may be a timestamp that reflects the actual time of the modification. Yet in other implementations, a different non-cyclical identifier may be used to track the changes to the data values.

The data values in the data set may be changed or modified through the user interface 24. These changes may be made by a system administrator accessing the first system 20 or, alternatively, by other systems in the network that are authorized by making these modifications. When a data value is modified in the database 22, the first system 20 sends a message to the other systems 30 and 40 in the network 10 to update their respective versions of the data set. In this example, the messages are sent to the other systems asynchronously; however, the messages may also be transmitted between the systems using other suitable methods. These messages are sent to the other systems in the network through message transport layer 26. The message transport layer 26 also receives messages from the other systems. In this example, a network 12 connects the first system 20, second system 30, and third system 40. The network 12 may be a LAN, the Internet, or another suitable network.

In the FIG. 1 example, the second system 30 and third system 40 are similar to the first system 20. The systems 30 and 40 include databases 32 and 42 that store the each system's version of the data set, user interfaces 34 and 44 through which each system may modify its data set, and message transport layers 36 and 46 to send and receive messages.

FIG. 2 is a diagram of an example message format that may be used for messages transferred between the systems 20, 30, and 40 of FIG. 1. The message 50 includes a sending system identifier 52, which identifies the system from which the message is being sent. A delta value is also included in the message 50. The delta value indicates the value of the change that was made to the sending system's data set that prompted the generation of the message 50. For example, the data value would be +5 if the sending system modifies its data value from five to ten. In other implementations, the delta value 52 may be omitted.

The message 50 also includes a first system data value 56, a second system data value 58, and a third system data value 60. The data values 56, 58, and 60 reflect the most recent data values for the respective systems in the sending system's data set. The data value may be a number, such as in the inventory example, or in other examples, may be some other data type. The message also includes first system change value 62, second system change value 64, and third system change value 66. The change values 62, 64, and 66 correspond to the data values 56, 58, and 60. The change values 62, 64, and 66 allow the system receiving the message 50 to determine whether the receiving system's data set includes the most recent version of the data values, as is discussed in greater detail below. The message also includes a total value 68. In the FIG. 1 example, the total value 68 represents the sum of the system data values 56, 58, and 60. In other examples, the total value 68 may represent other information or may be omitted.

Figure 3:
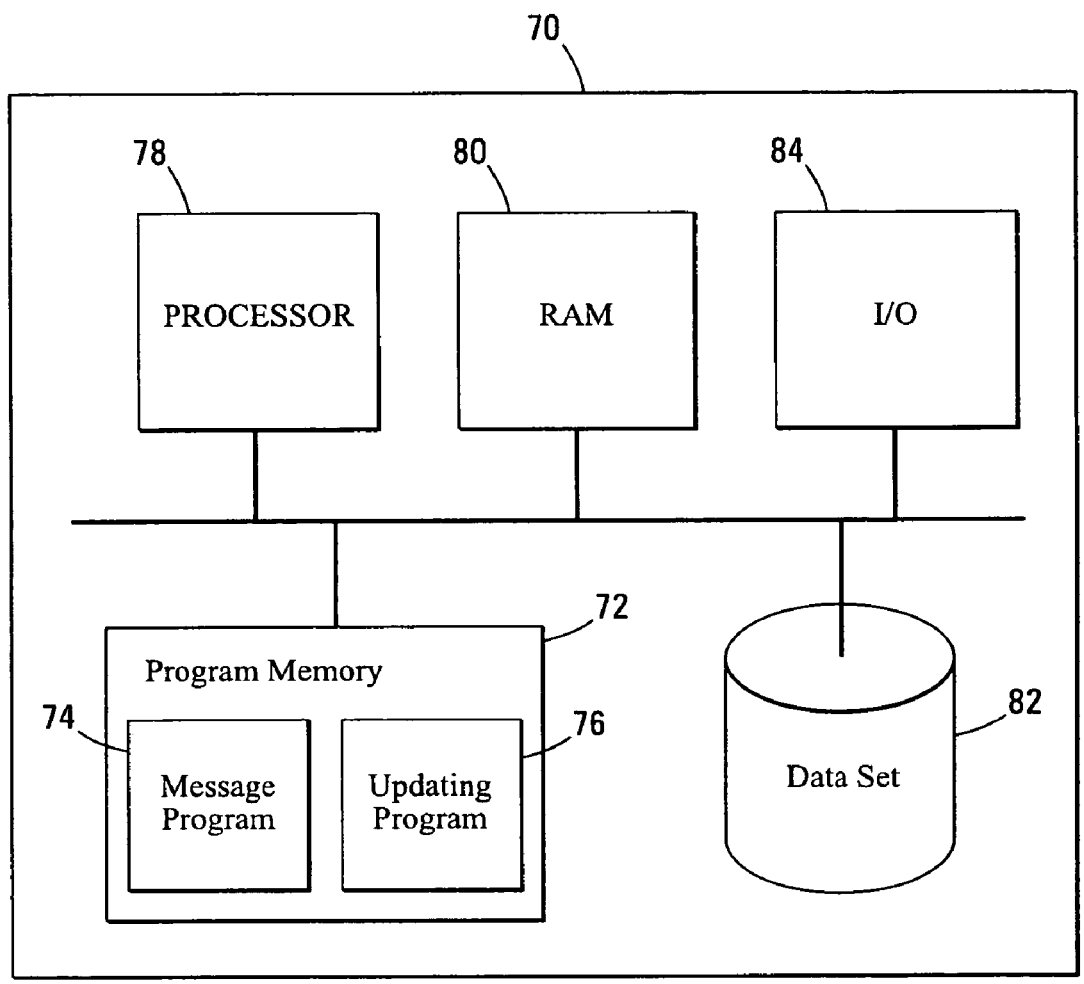
FIG. 3 is a block diagram of a computer system that may be included in the systems of FIG. 1.

FIG. 3 is a block diagram of a computer system 70 that may be included in the systems 20, 30, and 40 of FIG. 1. The computer system 70 includes a program memory 72 containing a message program 74 and an updating program 76. The message program 74 contains instructions that when loaded into RAM 80 and executed by processor 78 generate a message for transmission to another system in the network (for example, the message shown in FIG. 2). The processor 78 may obtain the information in the FIG. 2 message from the system's data set 82. The message may then be stored in RAM 80 until it is output by an input/output module 84 to a message transport layer (shown in FIG. 1). Messages may also be received through the input/output module 84 and stored in RAM 80 for processing. The updating program 76 contains instructions that when loaded into RAM 80 and executed by processor 78 processes the received messages stored in RAM 80 and, if necessary, updates the data values stored in data set 82.

Figure 4:
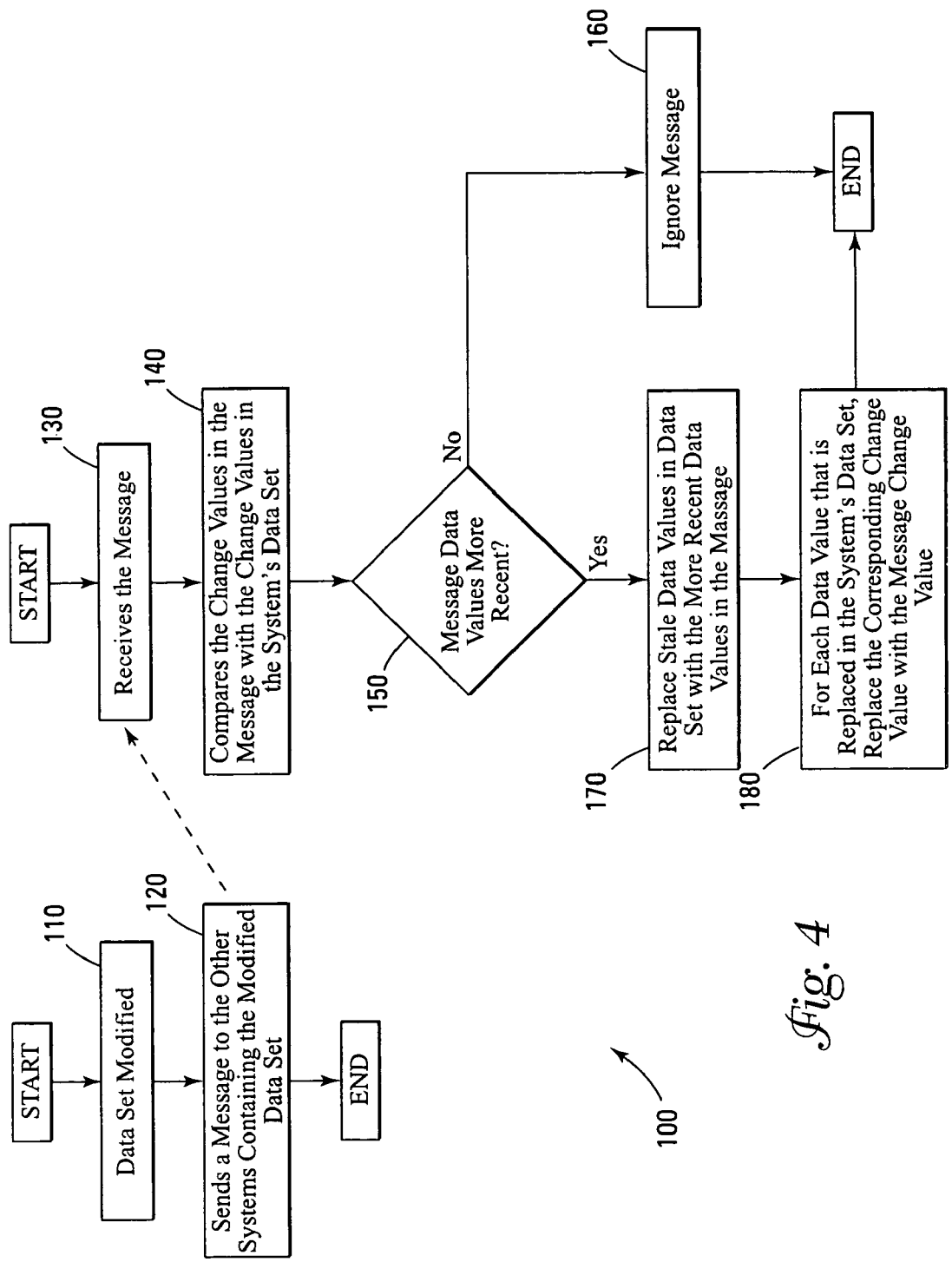
FIG. 4 is a flowchart of a method of updating a data set of a system shown in FIG. 1.

FIG. 4 is a is a flowchart of a method 100 of updating a data set of a system. The FIG. 4 example illustrates the method 100 using the example of FIG. 1. The method 100 begins at step 110 with the modification of the first system's data set, as described previously. Next, the first system 20 sends an asynchronous message to the other systems 30 and 40 containing the first system's modified data set at step 120. The message may contain a data value for each of the systems 20, 30, and 40 and corresponding change values, such as the message 50 shown in FIG. 2. The message may also include a sending system identifier, a delta value, and a total value; however, these message components are optional and may be omitted.

The second system 30 receives the update message sent by the first system 20 at step 130. After the message is received, the second system 30 compares the change values in the message with the corresponding change values in the second system's data set at step 140. If the second system 30 determines at step 150 that each data value in second system's data is as recent or more recent than the corresponding data values in the message, the second system ignores the contents of the message at step 160. If, on the other hand, the change values indicate that a data value in the message is more recent than a corresponding data value in second system's data set, the data value in the second system's data set is replaced with the more recent data value in the message at step 170. For each data value in the second system's data set that is replaced with a data value in the message, at step 180 the second system replaces the corresponding change value in the second system's data set with the change value in the message.

In other examples, the sending system identifier (shown in FIG. 2) may be included in the update message. For example, in implementations where the data value and change value of the system receiving the update message are not included in the update message, the message may include the sending system identifier to indicate that the receiving system's data value and change value were intentionally left out of the message.

In other implementations, the total value (shown in FIG. 2) may be included in the update message. The total value may be used to verify a state of equilibrium between the data sets of the sending and receiving systems. For example, if the change values in the message and the change values in the receiving system's data set are equal after the receiving system's data set is updated, the total value in the message and the data set may be compared. If the total values are equal, then the data sets of the sending and receiving systems are in a state of equilibrium. If the total values are not equal, then another process may be run by the systems to repair the inconsistencies. Yet in other examples, the total value may be used to detect errors in the data values transmitted in the message.

FIG. 5 is a table that illustrates the FIG. 4 method of updating the data set of a system in a network. The table 200 includes three columns 202, 204, and 206 that correspond to the first system 20, second system 30, and third system 40, respectively. Each row of the table 200 represents a time periods from T0 to T16. The contents of the data sets shown in the columns 202, 204, and 206 are shown in a format +A (B, C, D)[E, F, G] H. This format is consistent with the example message protocol shown in FIG. 2. For example, the +A represents the delta value. The data value vector (B, C, D) represents the first system data value (B), the second system data value (C), and the third system data value (D). The change value vector [E, F, G] represents the first system change value (E), the second system change value (F), and the third system change value (G). The H represents the total value, or the sum of the components of the data value vector. Using the FIG. 1 inventory example, the data vector includes numbers that represent the cumulative total of the inventory modifications made by each of the systems in the network. The change value in this example is a version number that is incremented after each modification of the corresponding data value. Thus, in this example, a higher change value number indicates that the corresponding data value is more recent. The total value represents the total amount of inventory in the combined systems.

At T0, the contents of the data sets for the systems are in a state of equilibrium at (0, 0, 0)[0, 0, 0] 0. At T1, the data set of the first system in column 202 is modified by the addition three units of inventory. The contents of the first system's data set is changed to (3, 0, 0)[1, 0, 0] 3, which indicates that the first system data value is three, the first system's change value is one, and the total value is three. After the modification of the first system's data set, the first system sends an asynchronous message to the other systems containing the modified data set, as discussed previously.

At T2, the first system's data set is modified again with the addition of four more units of inventory. The contents of the first system's data set is changed to (7, 0, 0)[2, 0, 0] 7, which indicates that the first system's data value is seven, the first system's change value is two, and the total value is seven. After the modification, the first system sends another asynchronous message to the other systems in the network.

At T3, the second system receives the T2 message (7, 0, 0)[2, 0, 0] containing the first system's modified data set. In the FIG. 5 example, the update messages only include the data values and the change values. In other examples, the sender identifier, the delta value, and the total value may also be included, as discussed previously. In accordance with the FIG. 4 method, the second system compares the change values of the message to the corresponding change values of the second system's data set. The comparison reveals that the first system change value in the message (2) is more recent than the corresponding change value of the data set (0). Therefore, the second system replaces the first system data value in the data set with the first system data value in the message. The corresponding first system change value is also replaced. After the update, the contents of the second system data set are (7, 0, 0)[2, 0, 0] 7.

At T5, the data set of the third system is modified with the addition of two units of inventory. With this modification, the third system's data set is changed to (0, 0, 2)[0, 0, 1] 2. At T6, the data set of the second system is modified with the subtraction of four units of inventory. The data set of the second system (7, 0, 0)[2, 0, 0] 7 is updated to (7, −4, 0)[2, 1, 0] 3. After the modifications, both systems send their modified data set to the other systems in the network.

At T7, the third system receives the update message (7, −4, 0)[2, 1, 0] generated by the second system after the modification at T6. The contents of the message are compared to the contents of the third system's data set (0, 0, 2)[0, 0, 1] 2. The change values for the first and second systems indicate that the first system data value (7) and the second system data value (−4) are more recent than the corresponding data values of the third system data set. At T8, the data values and corresponding change values in the third system data set are replaced in accordance with the FIG. 4 method to (7, −4, 2)[2, 1, 1] 5. In this example, the third system did not receive either of the update messages generated by the first system at T1 or T2. Because the update from the second system included the data values and change values for all systems in the network, the third system was updated with the first system modifications previously received by the second system.

At T9, the first system receives the update message (0, 0, 2)[0, 0, 1] generated by the third system after the modification at T5. At T10, the contents of the first system's data set are compared to the contents of the T9 message. The comparison indicates that the data value for the third system is more recent than the data value in the first system's data set. Accordingly, the first system's data set (7, 0, 0)[2, 0, 0] 7 is updated to (7, 0, 2)[2, 0, 1] 9.

At T11, the third system receives the message (3, 0, 0)[1, 0, 0] generated by the first system after the modification at T1. The first system change value in the third system's data set indicates that the data set's first system data value is more recent than the corresponding data value in the message. The third system's data set is more recent because the modifications of the first system at T1 and T2 were received through an update message from the second system at T7. Consequently, the values in the third system's data set are more recent and the T1 update message is ignored at T12.

At T13, the first system receives the message (7, −4, 0)[2, 1, 0] generated by the second system after the modification at T6. The second system change value in the message is more recent than the second system change value in the first system's data set. Accordingly, at T14 the first system data set (7, 0, 2)[2, 0, 1] 9 is updated with the second system data value in the message and the corresponding change value to (7, −4, 2)[2, 1, 1] 5.

At T15, the second system receives the message (0, 0, 2)[0, 0, 1] generated by third system after the modification at T5. The message's third system change value is more recent than the third system change value of the second system's data set. Thus, the second system data set (7, −4, 0)[2, 1, 0] 3 is updated with the third system data value in the message and corresponding change value to (7, −4, 2)[2, 1, 1] 5. After this modification, the data sets of the three systems are in equilibrium as shown in the last row of the table 200 labeled "status."

A number of embodiments of the invention have been described. Nevertheless, it will be understood that various modifications may be made without departing from the spirit and scope of the invention. For example, the method of updating the data sets of the systems is applicable to networks with more than three systems. The method may also be used in networks that may develop inconsistencies between the various system data sets but do not employ asynchronous messaging. Accordingly, other embodiments are within the scope of the following claims.

What is claimed is:

1. A method of updating a locally stored version of a data set, wherein multiple application systems each maintain a separate stored version of the data set and are each capable of modifying an attribute of the data set, wherein the attribute comprises multiple attribute components that are each associated with a different one of the multiple application systems, and wherein each attribute component has a data value and a change value, the method comprising:

receiving, from a first application system of the multiple application systems and at a second application system of the multiple application systems, a message containing a data set as locally stored in the first application system, wherein the message received by the second application system from the first application system includes the attribute component associated with the second application system; and for each attribute component of the received data set, comparing the attribute component's change value as stored locally in the second application system with the attribute component's change value as contained in the received data set, and if the comparison indicates that the version of the attribute component's data value as stored locally in the second application system is less recent than the version of the attribute component's data value contained in the received data set, replacing the attribute component's data value stored locally in the second application system with the attribute component's data value contained in the received data set.

2. The method of claim 1 wherein the change value of the attribute component is a timestamp that indicates the time of the modification to the attribute component's data value.

3. The method of claim 1 wherein the change value of the attribute component is a version number that is incremented after each modification to the attribute component's data value.

4. The method of claim 1 wherein the first application system sends messages to the second application system after each modification of the first application system's data set.

5. The method of claim 4 wherein the first application system uses asynchronous message transfer to send the messages to the second application system.

6. The method of claim 1 wherein the message further comprises a total value that represents a sum of the attribute component data values in the data set as locally stored in the first application system.

7. In a multiple-system environment wherein each of the multiple application systems maintain a separate stored version of a data set and are each capable of modifying an attribute of the data set, the attribute comprising multiple attribute components that are each associated with a different one of the multiple application systems, and wherein each attribute component has a data value and a change value, a computer readable storage medium having embedded thereon executable instructions that when executed cause a processor of a receiving application system in the multiple-system environment to:

receive, from a sending application system, a message containing a data set as locally stored in the sending application system, wherein the message received by the receiving application system from the sending application system includes the attribute component associated with the receiving application system; and for each attribute component of the data set, compare the attribute component's change value as stored locally in receiving application system with the attribute component's change value as contained in the received data set, and if the comparison indicates that the version of the attribute component's data value as stored locally in the receiving application system is less recent than the version of the attribute component's data value contained in the received data set, replace the attribute component's data value stored locally in the receiving application system with the attribute component's data value contained in the received data set.

8. The computer readable storage medium of claim 7 wherein the change value of the attribute component is a timestamp that indicates the time of the modification to the attribute component's data value.

9. The computer readable storage medium of claim 7 wherein the change value of the attribute component is a version number that is incremented after each modification to the attribute component's data value.

10. The computer readable storage medium of claim 7 wherein the sending application system sends messages to the receiving application system after each modification of the sending application system's data set.

11. The computer readable storage medium of claim 10 wherein the sending application system uses asynchronous message transfer to send the messages to the receiving application system.

12. The computer readable storage medium of claim 7 wherein the message further comprises a total value that represents a sum of the attribute component data values in the data set as locally stored in the sending application system.

* * * * *